United States Patent [19]

Saliger

[11] Patent Number: 4,534,585
[45] Date of Patent: Aug. 13, 1985

[54] PIPE JOINT LOCKING DEVICE

[75] Inventor: Kenneth C. Saliger, DeSoto, Tex.

[73] Assignee: Mobil Oil Corporation, New York, N.Y.

[21] Appl. No.: 454,780

[22] Filed: Dec. 30, 1982

[51] Int. Cl.³ .............................................. F16L 15/00
[52] U.S. Cl. ...................................... 285/92; 285/89; 285/286; 285/333
[58] Field of Search ................. 285/92, 354, 357, 386, 285/393, 89, 286, 342, 333, 334; 403/342, 343

[56] References Cited

U.S. PATENT DOCUMENTS

| | | |
|---|---|---|
| 1,390,931 | 9/1921 | Shamberger . |
| 1,407,335 | 2/1922 | Reynolds et al. . |
| 1,417,411 | 5/1922 | Reynolds et al. . |
| 1,512,570 | 10/1924 | Andrews . |
| 1,559,874 | 11/1925 | Holland . |
| 1,652,542 | 12/1927 | Perry . |
| 1,796,806 | 3/1931 | Pearson ............................ 285/386 X |
| 1,936,815 | 11/1933 | Wilkinson ............................. 285/46 |
| 2,143,568 | 1/1939 | Munro ............................. 285/354 X |
| 2,247,032 | 6/1941 | Norton ................................ 285/166 |
| 2,273,017 | 2/1942 | Boynton ........................... 285/393 X |
| 2,449,588 | 9/1948 | Clafford ............................. 285/89 |
| 2,517,617 | 8/1950 | Woodling ......................... 285/122 |
| 2,948,553 | 8/1960 | Gill et al. ............................... 284/4 |
| 3,382,892 | 5/1968 | Cerbin .......................... 137/614.02 |
| 3,848,905 | 11/1974 | Hammer et al. .................... 285/286 |
| 3,888,521 | 6/1975 | O'Sickey ........................... 285/341 |
| 4,082,326 | 4/1978 | Bryson .............................. 285/238 |

FOREIGN PATENT DOCUMENTS 290526 5/1928 United Kingdom ................ 285/357

Primary Examiner—Dave W. Arola
Attorney, Agent, or Firm—Alexander J. McKillop; Michael G. Gilman; Charles J. Speciale

[57] ABSTRACT

A pipe joint adapted to be utilized in flow lines or well casings in which clockwise and counter-clockwise rotation is imparted to the pipe joint in order to provide for the remote subsea make and break connections between a floating vessel and a subsea well or subsea production riser base. More particularly, the invention resides in a pipe joint incorporating a locking connection enabling the pipe joint between the floating vessel and the remote subsea make and break connection to be able to transmit torque, without in any manner affecting the mechanical and pressure integrity of the pipe joint.

4 Claims, 3 Drawing Figures

PIPE JOINT LOCKING DEVICE

BACKGROUND OF THE INVENTION

1. Field of the Invention

The present invention relates to a pipe joint adapted to be utilized in flow lines or well casings in which clockwise and counter-clockwise rotation is imparted to the pipe joint in order to provide for the remote subsea make and break connection between a floating vessel and a subsea well or subsea production riser base. More particularly, the invention resides in a pipe joint incorporating a locking connection enabling the pipe joint between the floating vessel and the remote subsea make and break connection to be able to transmit torque, without in any manner affecting the mechanical and pressure integrity of the pipe joint.

Basically, pipe joints of this particular type which are utilized in flow lines or well casings, are pipe joints subjected to reverse rotation in remote subsea make and break connections between a floating vessel and a subsea well or subsea production riser base, and wherein each pipe joint essentially consists of a tubular pin which is adapted to be threaded into the tubular box of a contiguous flowline section or well casing through the intermediary of a sealing screw thread; in essence the tubular pin end having the male threaded end portion adapted to be sealingly screwed into engagement with a female thread formed in the tubular box end. This type of sealing screw thread connection is in common and widespread use in oil field casing and tubing joints and provides the required mechanical interconnection and pressure integrity of the pipe joint. Subsequent to the forming of the pipe joint connection through imparting the necessary locking torque to the mating screw threads between The tubular joint pin and tubular box of the pipe joint, due to the continual clockwise and counter-clockwise rotation which is imparted to the flowlines or well casings, and as a result to the pipe joints, the pipe joints must be able to transmit torque without causing any mechanical loosening of the threaded interconnection between the tubular pin and box of the pipe joint tending to adversely affect the integrity of the joint. In order to maintain this integrity of the pipe joint, from both mechanical and pressure standpoints, consideration has been given in the technology to the incorporation of a locking arrangement or device into the pipe joint which is capable of transmitting the torque generated during the reverse rotation of the flow lines or well casings, and as a result of the pipe joints, without affecting the integrity of the screw threaded interconnections between the components of the pipe joints. In essence, the locking arrangement or device incorporated in the pipe joint will then be capable of transmitting torques produced during the operation of the facilities employing the pipe joints.

Although various types of locking devices are known in the technology which will enable pipe joints or tool joints, such as those which are used in the flowlines or well casings for oil well exploration and production, in general such locking devices are of the type which, although capable of transmitting torque and to some extent protective of the mechanical and pressure integrity of the pipe joints, will weaken the physical structure of the pipe joints so as to reduce the mechanical strength thereof, particularly when employed for lengthy periods and when the pipe joints are exposed to the repeated clockwise and counterclockwise rotation of the flow lines or well casings during operation.

2. Discussion of the Prior Art

Wilkinson U.S. Pat. No. 1,936,815 discloses a tubular condenser wherein an interconnection is provided between the tubular components through the utilization of a locking nut which is threaded onto one connecting tube components and which incorporates a ferrule having a generally wedge-shaped cross-section which is adapted to be wedged into gripping engagement against the outer circumferential surface of the mating tubular component so as to thereby form a locking joint connection. In this instance, the locking element, although capable of transmitting torque, is not adapted to preserve the mechanical and pressure integrity of the condenser joint responsive to the loosening of the locking arrangement.

Hammer et al. U.S. Pat. No. 3,848,905 discloses a high-pressure fitting wherein a ferrule setting nut is adapted to wedge a ferrule into gripping contact against the outer circumferential surface of a first tubular member as the ferrule nut is threaded onto the end of a second connecting tubular member. Although this ferrule construction will provide a pressure-tight connection, the locking device set forth herein is not capable of preserving the mechanical and pressure integrity of a pipe joint, particularly when the latter is subjected to any reversible rotation of the tubular members.

Similarly, Woodling U.S. Pat. No. 2,517,617, Bryson U.S. Pat. No. 4,082,326, Norton U.S. Pat. No. 2,247,032 and O'Sicky U.S. Pat. No. 3,888,521 each disclose pipe joints or tube connectors wherein a ferrule or similar wedge-like element is adapted to be forced into gripping contact against the outer surface of a tubular member through the action of a ferrule setting nut which threadingly engages a second tubular member in order to provide a pressure-tight joint or connection for the tubing. However, none of these prior art locking arrangements are adapted to be able to transmit torque for reversably rotatable piping structures, particularly when such is employed for flowlines or well casings in oil well exploration or production, and would not be capable of preserving the mechanical and pressure integrity of such types of pipe or conduit joints.

Other prior art patents which relate to tool or pipe joints, particularly such as are employed as components of flowlines or well casings in oil well exploration and production, include different types of locking devices for permitting transmission of torque through the pipe joints.

Thus, Holland U.S. Pat. No 1,559,874 relates to a tool joint in which a tubular box adapted for connection to a tubular pipe section is threadingly engaged with a joint pin end through the intermediary of a tapered threaded portion, all of the elements being constructed of hardened steel. In essence, both the pin member and the box member of the pipe joint are arranged to be employed for rotary drilling of oil wells whereby, in order to preserve the integrity of the joint, a suitable locking pin or dowel extends coaxially with the pipe joint so as to interengage the interconnected joint members, with the pin being adapted to be slid out of engagement when necessary to facilitate the assembly and disassembly of the box and pin elements of the pipe joint. Although the structure thereof ensures that the pipe joint can be subjected to torque loads during the rotation of the pipe length, the drilling of apertures or bores into the joint for receiving of the pins or dowels within the members results in a rather weak mechanical construction which can readily lead to the shearing of the dowel or pin and lead to loss in the integrity of the pipe joint during extensive reversing rotation to which such a flowline or well casing may be subjected.

Shamberger U.S. Pat. No. 1,390,931 provides for a stem and bit locking device which may be employed in pipe strings for wells wherein a dowel pin extends between the coupling components, is spring-loaded into positive engagement therebetween and adapted to be recessed when necessary so as to effectuate for disengagement of the coupling elements. Herein, as in Holland '874 the mechanical strength of such an arrangement is quite restricted and, during continuously reversing or alternating clockwise and counter-clockwise rotation, it is difficult to ascertain that the coupling as constructed in this instance would be capable of withstanding high torque loads.

Reynolds et al. U.S. Pat. Nos. 1,407,335 and 1,417,411 each disclose a tool joint in which a pipe joint for oil well drilling consist of a box member and a pin, interconnectable through a tapered locking or sealing thread, is adapted to be secured through the interposition of a dowel pin extending coaxially through the end of the box member and projecting into a recess formed in the pin end. In order to disassemble the locking device, this would entail destroying the integrity of the pipe coupling and, moreover, the structure requires bores to be drilled axially and transversely through the pipe coupling so as to render it mechanically weak when subjected to high torque loads produced during the continuously reversing rotation of the drill string of which such a pipe joint or coupling is a component.

Gill et al. U.S. Pat. No. 2,948,553, Perry U.S. Pat. No. 1,652,542 and Cerbin U.S. Pat. No. 3,382,892 each disclose quick-disconnect valve and pipe couplings wherein axially extending dowel pins may be positioned intermediate the members to provide for torque transmission during the assembly of the coupling and during continual reverse rotation. There is no disclosure of a lock device and construction analogous to that provided for by the present invention.

Finally, Andrews U.S. Pat. No. 1,512,570 discloses the positioning of a locking dowel or bolt intermediate two concentrically arranged members in order to prevent relative rotation therebetween, and has no bearing on a pipe joint locking device for preserving the mechanical and pressure integrity of the pipe joint which is subjected to torque during rotation thereof.

In order to meet the rigorous demands of the technology relative to the construction of pipe joints employed in flowlines or well casings in which there is encountered a reversible rotation, and for the formation of a remote subsea make and break connection between a floating vessel and a subsea well or subsea production riser base, it is necessary to provide a construction for the pipe joints in the flowlines or casings which is able to transmit torque produced during the clockwise and counterclockwise rotation thereof without affecting the mechanical and pressure integrity of the pipe joints.

SUMMARY OF THE INVENTION

For this purpose, the pipe joint incorporates a novel locking arrangement or device enabling torque to be readily transmitted therethrough without affecting the mechanical and pressure integrity of the pipe joints. Consequently, in accordance with one embodiment of the invention, a pipe joint of the type described consists of a tubular pin having a tapered male sealing screw thread adapted to be interengaged with a complimentary female screw thread on a tubular box for a flowline or the like, includes a ferrule of generally wedge-shaped cross-sectional configuration encompassing the external circumference of the tubular pin. The ferrule is adapted to be jammed into contacting gripping engagement between the tubular pin and an end surface on the attached tubular box through the intermediary of a ferrule setting nut rotatably mounted on the box, so as to form a locking connection for the pipe joint adapted to readily transmit torque without in any manner affecting the mechanical and pressure integrity of the pipe joint. The wedging of the ferrule, which in a preferred embodiment may be a split ferrule, in order to produce a frictional surface engagement between the tubular pin, the ferrule and a conical ferrule seat surface formed on the tubular box, allows for the transmission of torque intermediate these components without affecting the mechanical and pressure integrity of the sealing screw thread of the pipe joint.

Pursuant to a modified embodiment of the invention, a recess is formed in an enlarged diameter portion of the tubular pin proximate the base end of the sealing screw thread connection with the tubular box, within which recess there are arranged two annular ring members in an axially contiguous or tandem relationship, one ring member being fastenable to the tubular box and the other ring member to the tubular pin through the intermediary of at least one axially extending dowel pin. Subsequent to the threaded engagement being effected between the tubular pin and the tubular box of the pipe joint, the ring members are adapted to be welded together by means of suitable tack welds spaced about the circumference of the pipe joint, thereby forming a rigidly locked together interconnection which is adapted to transmit torque imparted to the pipe joint through the rings and dowel pins. In order to break the connection, it is merely necessary to cut the circumferentially spaced tack welds on the ring members, thereby disengaging the latter, and to unscrew the tubular pin from the tubular box, any such welding and resultant welding heat being limited to the ring members so as not to have any detrimental effect on the material of the tubular box and tubular pin and thereby preserving the integrity of the pipe joint.

Accordingly, it is a primary object of the present invention to provide a locking arrangement for a pipe joint adapted to be used in flowlines or well casings wherein reverse rotation is imparted thereto and whereby the structure is adapted to transmit torque without affecting the mechanical and pressure integrity of the pipe joint.

A more specific object of the present invention is to provide a pipe joint incorporating a locking arrangement of the type described wherein a torque transmitting locking arrangement comprises a ferrule adapted to be wedged in a frictional gripping engagement intermediate the tubular pin and tubular box of the pipe joint subsequent to assembly of the latter and wherein the ferrule is forced between the pipe joint components through the intermediary of a ferrule setting nut which is rotatably mounted on the tubular box of the pipe joint.

Another object of the present invention resides in the provision of a lock arrangement for a pipe joint of the type described wherein a pair of ring members positioned in adjacent relationship encompass the pipe joint and wherein one ring member is respectively, fastened to the tubular pin and the other ring member to the tubular box of the pipe joint through the intermediary of dowel pins extending between the components, and wherein subsequent to the assembly of the pipe joint, the rings are adapted to be welded together to provide a fixed locking device capable of transmitting torque without affecting the mechanical and pressure integrity of the pipe joint.

BRIEF DESCRIPTION OF THE DRAWINGS

Reference may now be had to the following detailed description of preferred embodiments of a pipe joint incorporating a locking arrangement pursuant to the invention, taken in conjunction with the accompanying drawings; in which.

Figure 1:
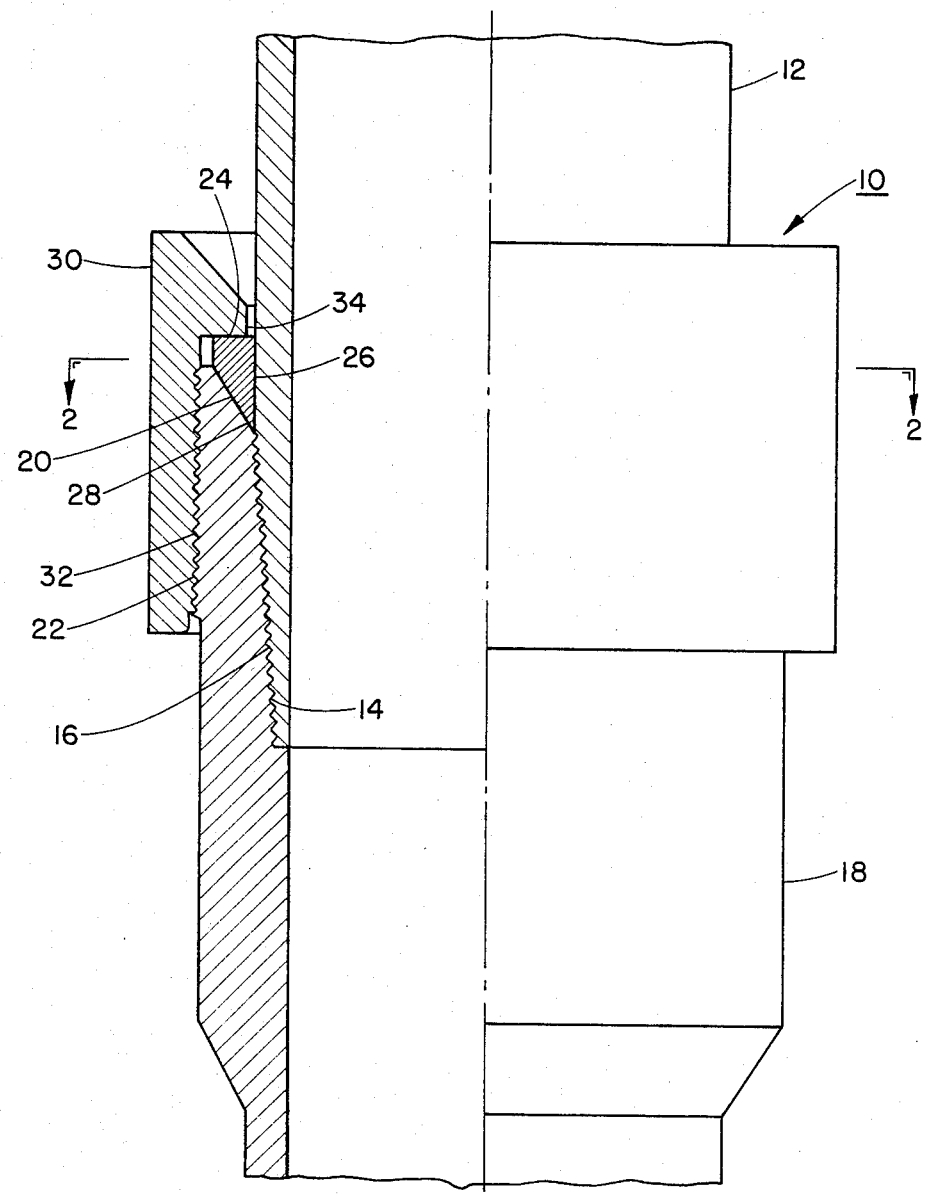
FIG. 1 illustrates a longitudinal view, partly in section, of a pipe joint incorporating a first embodiment of a locking connection pursuant to the invention.
Figure 2:
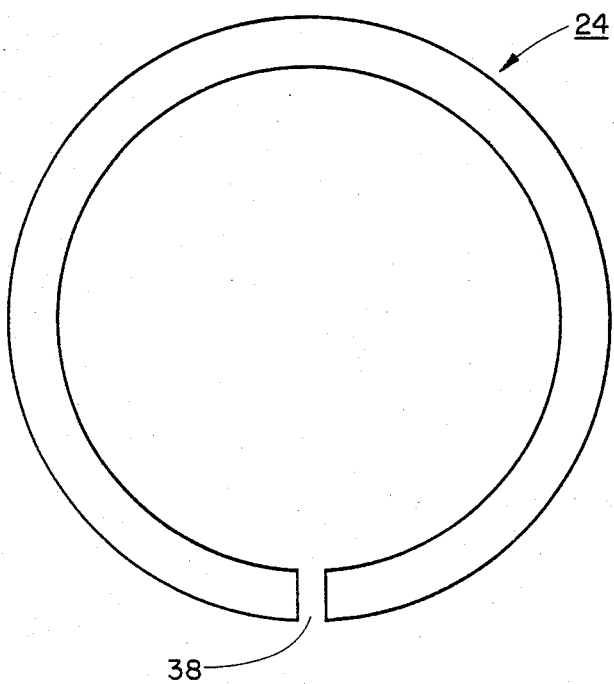
FIG. 2 illustrates a view taken along line 2—2 in FIG. 1.

Referring now in detail to the drawings, and in particular the embodiment illustrated in FIGS. 1 and 2, a pipe joint 10 pursuant to the invention is adapted to be utilized in flowlines or well casings employed in oil well as exploration and production, wherein reversible or clockwise and counterclockwise rotation is necessitated in order to produce, for example, a remote subsea make and break connection between a floating vessel and a subsea well or subsea production riser base.

In this embodiment, the pipe joint 10 consists of a tubular pin 12 having an external tapered sealing screw thread 14 at one end thereof which is adapted to engage a complimentary tapered internal sealing screw thread 16 formed at the end of a tubular box 18, as is well known in the technology.

In this embodiment, the inventive locking connection is formed in that the end of the tubular box 18 is provided with an annular outwardly tapering conical surface 20 which extends between the internal screw thread 16 and an external screw thread 22 on the tubular box 18. Arranged intermediate the joint pin 12 and the joint box 18 in a wedge-like or tapered annular gap between the conical surface 20 and the outer circumferential surface of the pin 12 is a ferrule 24 which may be correspondingly wedge-shaped in cross-section, and which ferrule extends about the circumference of the joint pin 12. The ferrule 24 includes a generally cylindrical surface 26 which may be knurled and a conical surface 28 extending at an angle so as to be in general conformance with the degree of the taper of the conical surface 20 at the end of the box 18. The surface 28 on the ferrule may also be knurled so as to, in a similar to surface 26, provide a high-frictional gripping surface contact among the contacting surface of the joint components 12, 18 and 24.

A ferrule setting nut 30 includes an internal thread 32 which engages with the external screw thread 22 on the tubular box element 18, and also includes a radially inwardly extending annular flange portion 34 at one end adapted to contact the upper end surface of the ferrule 24.

Subsequent to the completing of the mechanical and pressure-tight connection between the pipe joint components 12 and 18 through interengagement of the sealing screw threads 14 and 16, the ferrule setting nut 30 is threaded down onto the external screw thread 22 on the tubular member 18 and exerts an axial wedging force against the end surface of ferrule 24, causing the latter to be firmly wedged into the conical gap between the pin 12 and the box 18, and the surfaces 20 and 26 to grippingly contact in frictional engagement with the adjoining surfaces of, respectively, the box 18 and the outer circumferential surface of the pin 12. This, in effect, will produce a locking action enabling torque to be transmitted through the ferrule lock connection and, upon loosening of the locking device will maintain the mechanical and pressure integrity of the pipe joint.

As illustrated in FIG. 2 of the drawings, the ferrule 24 may consist of a split ring having a gap 38 to provide for radial change in the size of the ferrule 24 upon the ferrule setting nut 30 being threaded down against its upper end surface.

Figure 3:
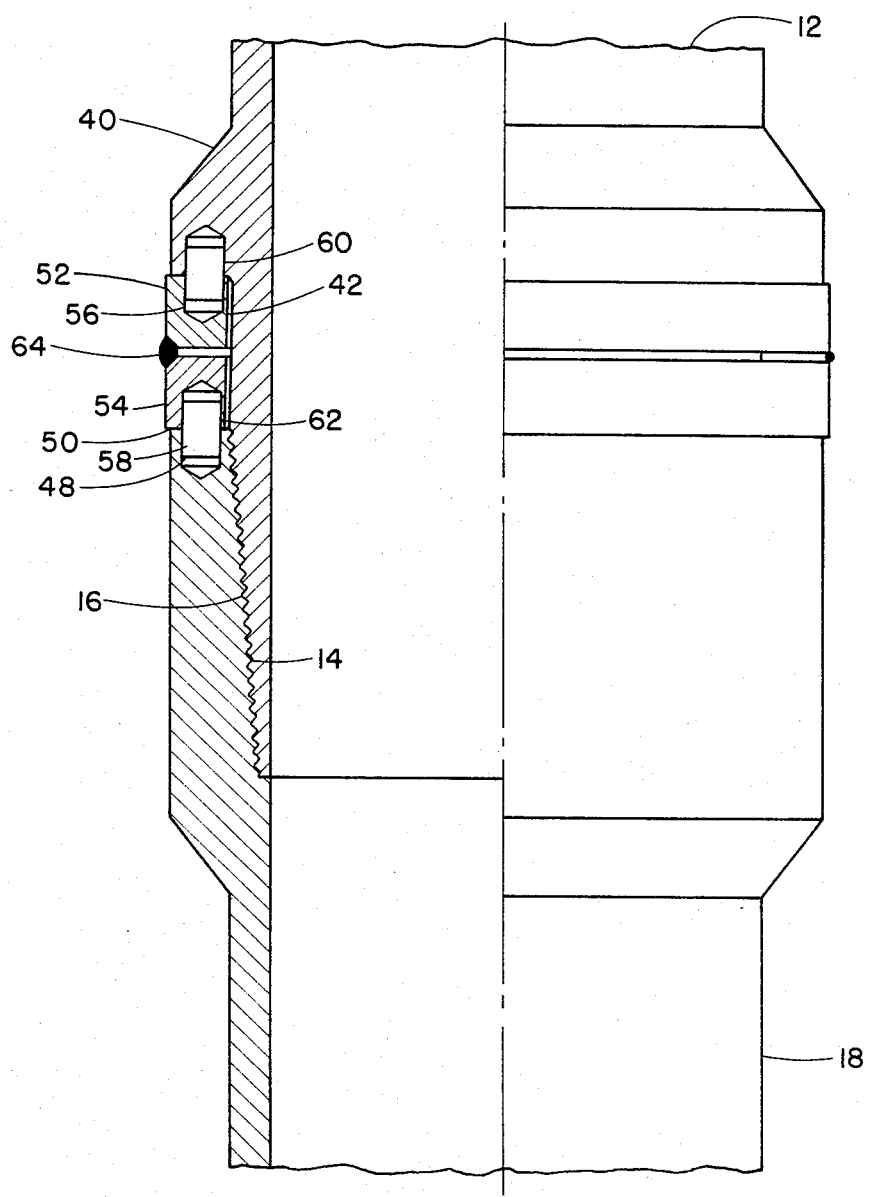
FIG. 3 is a view similar to that of FIG. 1 showing a second embodiment of a locking connection for the pipe joint.

In the embodiment of FIG. 3 of the drawings, wherein components similar or identical to those in FIGS. 1 and 2 are identified by the same reference numerals, the pin element 12 includes an enlarged diameter end portion 40 which is machined to provide an annular recess 42 towards the base of the sealing screw thread 14. Formed in the radial end surface or land 44 of the annular enlarged diameter portion 40 is at least one axial blind bore 46, although a plurality of such bores may be spaced along the circumference of the land 44. Similarly, axial blind bores 48 are provided in the end surface 50 of the pipe joint tubular box element 18. Positioned within the recess 42 are a pair of adjoining or contiguous annular ring members 52 and 54, preferably of steel, which also include, respectively, blind bores 56 and 58 in axial alignment with the respective axial blind bores 44 and 48 in the joint pin 12 and in the joint box 18.

During assembly of the pin 12 with the tubular box 18, dowel pins 60 are adapted to be positioned so as to extend through each of the bores 44 and 56, and in a similar manner dowel pins 62 in each of the bores 48 and 58, so as to lock the ring members 52 and 54 to, respectively, the pin 12 and box 18. Consequently, when the pipe joint is completely assembled through engagement of the tapered sealing screw threads 14 and 16, the ring members are firmly positioned within the annular recess 42. Thereafter, the rings are welded together through a plurality of suitable tack welds 64 which may be positioned in spaced relationship about the circumference of the rings, thereby fixedly interlocking the ring members and, as a result, the entire pipe joint arrangement 10 to form a torque transmitting structure which will not affect the mechanical and pressure integrity of the pipe joints.

In this embodiment, in order to provide for the loosening of the pipe joint or connection between the pin 12 and the box 18, it is merely necessary to chip off or cut the tack welds 64 so as to thereby enable relative rotation to take place between the pipe joint components. This can be done without any detrimental effect on the material of the tubular box and the tubular pin conceivably caused by the welds or welding heat since only the replaceable ring members 52 and 54 are welded together.

From the foregoing it becomes readily apparent to one skilled in the art that the construction of a locking arrangement for a pipe joint as described herein is of an extremely simple and dependable nature, and is able to transmit high amounts of torque without impairing the mechanical strength and pressure integrity of the pipe joint.

While there has been shown and described what are considered to be preferred embodiments of the invention, it will of course be understood that various modifications and changes in form or detail could readily be made without departing from the spirit of the invention. It is therefore intended that the invention be not limited to the exact form and detail herein shown and described, nor to anything less than the whole of the invention herein disclosed as hereinafter claimed.

What is claimed is:

1. In a pipe joint for flowlines or well casings subjected to reversible rotation, said pipe joint including a tubular box and a tubular pin directly interconnected through a cooperating sealing screw thread formed at the adjoining ends of said tubular box and tubular pin, the improvement comprising locking means engaging said tubular box and said tubular pin about the joint intermediate said tubular box and pin; said tubular pin including an enlarged diameter end portion facing towards the connecting end with said tubular box, an annular recess formed at said tubular pin end so as to provide parallel spaced radial lands, one said radial land being the surface on said enlarged diameter end facing towards the connecting end with said tubular box, and the other radial land being the end surface of said tubular box facing said enlarged diameter tubular pin end portion; a pair of spaced annular ring members positioned in said recess so as to encompass said tubular pin and contacting said lands, one said ring members having at least one blind bore in axial alignment with at least one blind bore in said enlarged diameter tubular pin end portion, a dowel pin extending through said bores to fasten said ring member to said tubular pin; the other said ring member having at least one blind bore in axial alignment with at least one blind bore in the end surface of said tubular box, a dowel pin extending through said bores to fasten said other ring member to said tubular box; and means for fixedly interconnecting said rings to facilitate transmission of torque through said pipe joint.

2. A pipe joint as claimed in claim 1, said means interconnecting said annular ring members comprising a plurality of tack welds spaced about the circumference of said rings members.

3. A pipe joint as claimed in claim 2, said ring members being constituted of steel.

4. A pipe joint as claimed in claim 1, comprising a plurality of dowel pins fastening said ring members to, respectively, the tubular pin and tubular box, said dowel pins engaging in a plurality of blind bores spaced about said pipe joint.

* * * * *